Figure 1:
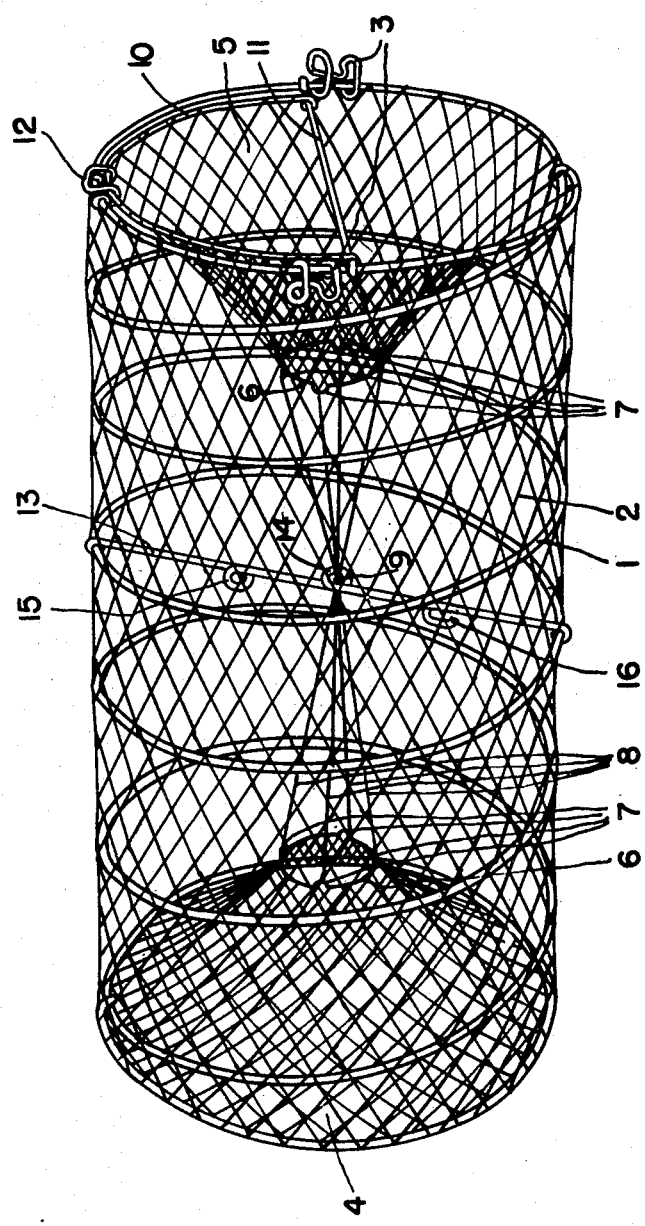

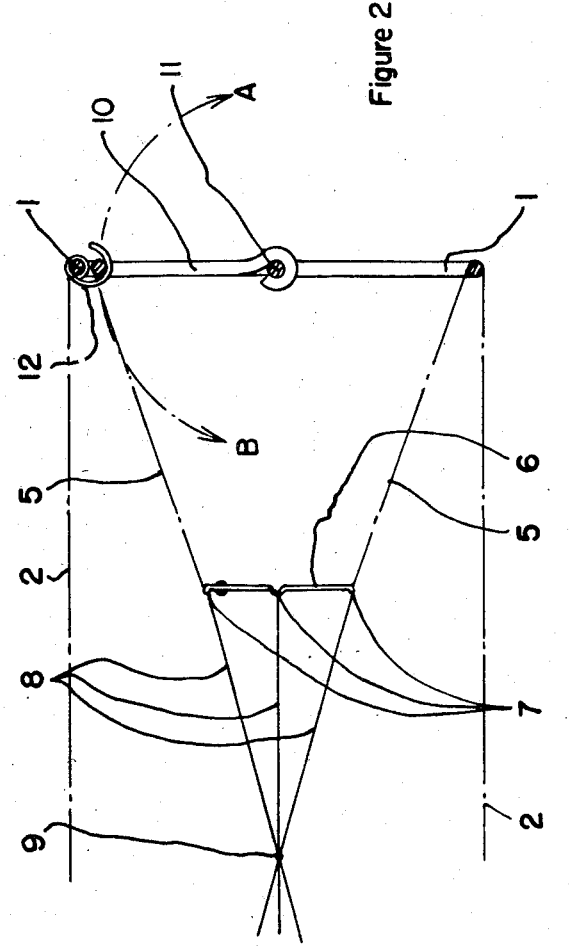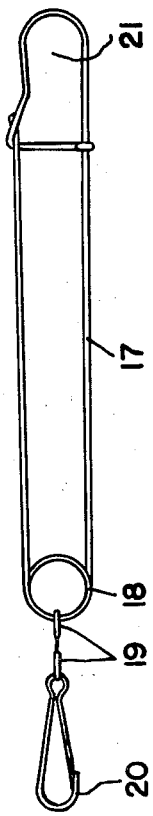

United States Patent Office 2,935,811
Patented May 10, 1960

2,935,811

NET CAGE FOR CATCHING CRAWFISH

Knut Ingvar Hurtig, Hagersten, Sweden

Application September 5, 1957, Serial No. 682,149

Claims priority, application Sweden October 30, 1956

4 Claims. (Cl. 43—105)

The present invention is concerned with a net cage for catching crawfish of the type in which a net is stretched over a cylindrical skeleton consisting of a helical spring; when the spring is compressed its individual spirals will come to lie close to each other and can in this compressed position be held together by hooks or the like. The cage is at least at one and preferably at each of its end portions provided with a funnel-shaped entry channel extending and tapering towards the interior of the cage. In the preferred embodiment of the cage, the two entry channels are held together by ropes or the like of such length that when the spring is released for expansion the funnels are kept in a stretched position by the stretching of the ropes. Such a cage has been described in for instance the Swedish patent specification No. 67,568.

However, such a construction has certain drawbacks which will often make the cage difficult to handle and are apt to considerably shorten its life. A particularly troublesome drawback is the following: The attaching and removing of bait and the taking out of the crawfish that has been caught can be effected only either through the entry passages or through a specially cut hole in the network which at each occasion must be opened and closed again by knotting with a thread or the like. This is inconvenient already in daylight and indeed very difficult in the darkness of night, i.e. at the time usually chosen for crawfish catching. Moreover, it is a general experience that the inner joining ropes tend to become entangled with each other and with the bait holder inside the cage, thus involving extra work and trouble. Another disadvantage resides in the fact that said ropes are disposed in such a manner that the crawfish can rather easily escape from the cage after having entered it.

It is an object of the present invention to eliminate these disadvantages and drawbacks, while at the same time retaining the advantage of allowing an easy packing of the cages. According to my invention, the cage has at least one entry channel which at its outer, comparatively wide end portion is provided with a hatch that can be opened and shut and will allow for a free and easy admittance to the interior of the cage. Preferably, the inner and narrower end portion of the entry channel is held in position by a number of ties or stretched straps which form entry passages tapering conically towards the center of the cage and prevent the hatch from opening towards the outside when the helical spring of the skeleton is expanded, but permit opening when said spring is compressed.

The bait holder can be provided with and liberated from the bait outside the cage, as it can readily be hooked on and removed from a suspension device which is constructed in such a manner that it cannot entangle with the aforesaid ties.

Figure 4:
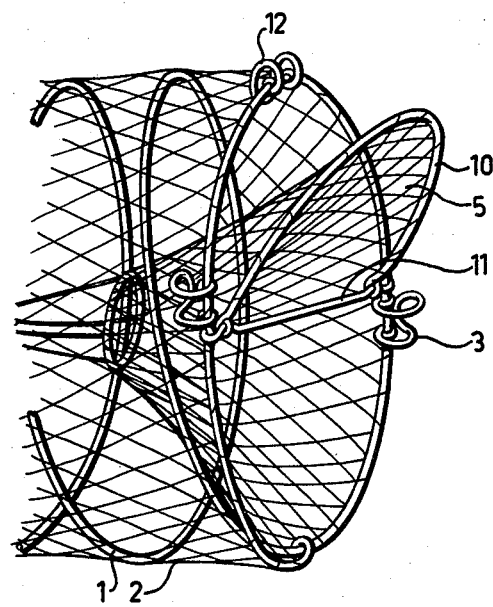

One embodiment of the invention is shown in the attached drawing, by way of example only. Fig. 1 shows the cage in perspective without bait holder attached in its interior, Fig. 2 shows a diagrammatical section through the gable or entry channel which can be opened (in the embodiment as here shown, only one half of the gable can be opened), Fig. 3 shows the bait pin removed from the cage, and Fig. 4 illustrates the hatch in partly open position.

The skeleton of the cage consists of a cylindrical helical spring 1 over which a net 2 is stretched and on which are disposed hooks 3 adapted to engage the edge of the opposite end of the skeleton 1 when the spring is compressed so that its spirals will lie close to each other. In this manner the hooks 3 will lock the cage in its compressed position, thus allowing an easy transportation.

The gable ends of the cage, i.e. the gable-shaped extensions of the net 2, are arranged so as to form funnel-shaped entry channels 4, 5 tapering towards the interior of the cage. These funnel-shaped portions 4, 5 are at their interior debouchment openings, which face each other, reinforced by a ring 6 provided with a number of jags, or recesses 7 towards the interior of the cage. The ties or straps 8 are non-slidably attached in these jags, and thus form a joint between the two rings 6 facing each other. By a knot 9 in their central portion they form an entry passage conically tapering towards the interior of the cage, this entry passage thus being shaped in such a manner as to give the crawfish free admittance to the inside of the cage but at the same time makes their leaving the cage very difficult. A part of the tapering, funnel-shaped portion 5 is constructed as a movable hatch, this part (in the embodiment as shown, forming one half of said portion) having been cut up, and of the two cutting edges thus formed one has been attached to the skeleton 1 and the other to an arcuate hoop or rim 10 which is slidably attached to a hinge bar 11 which in its turn is again attached to the skeleton 1. This hinge bar 11, as shown in the attached drawing, has also the advantage that it facilitates the finding of the openable end of the cage even when it is dark. To retain the rim 10 in position the skeleton 1 is provided with a fastening hook 12 with its open portion towards the outer side of the cage; when this fastening hook is turned round with its open portion towards the inside it will permit the rim 10 to turn round the hinge bar 11 and thus give free admittance to the interior of the cage. When the cage is adjusted to catching position, i.e. with hooks 3 opened and the spiral spring 1 expanded, the rim 10 which together with a part of the funnel-shaped net portion 5 forms the movable hatch cannot without difficulty be opened towards the outside (Fig. 2, direction A) because the stretched straps 8 will counter-act such an opening movement. On the other hand, the hatch can be opened towards the inside (Fig. 2, direction B) only after the fastening hook has been turned round. Only then will there be free admittance to the inside of the cage, and the crawfish caught can then be poured out of the cage or, if desired, the bait holder according to Fig. 3 can be hooked on or removed. If the cage is in compressed position, i.e. with the hooks 3 in locking position, the rim 10 can be opened towards the outside (Fig. 2, direction A) after the fastening hook 12 has been turned round; in this manner the rigidly and permanently attached suspension device 13 is freely exposed, and the bait holder (Fig. 3) can easily be hooked on or off. The fixed suspension device 13 is positioned in the center of the cage, being attached to the skeleton 1 diagonally, and has a central eye or loop 14 through which pass the straps 8 with their knot 9, thus preventing their becoming entangled with member 13. Moreover, the fixed suspension device 13 has a further eye or loop 15 and a hook 16, both for hooking on and taking off the removable bait holder. This bait holder is a pin 17 of the saftey-pin type which at its eye or loop end 18 is provided with a link 19 to which is attached a clasp 20 adapted to be hooked onto the ring 15. The locking end of the pin 17 forms a major loop 21 permitting the pin to be hooked onto hook 16.

The embodiment thus described and shown has been chosen only as an example. The construction according to the present invention can be varied in many ways without transgressing the scope of the invention. Among the possible variations may be mentioned for instance the following: The hatch may be made narrower, or wider, the rim 10 then being a hoop forming a whole ring and slidably attached to the skeleton 1. Alternatively, such a ring can be made totally removable and be attached to the skeleton 1 with the aid of spring clamps or the like. The bait holder and the fixed suspension device 13 may be varied in many different ways. For instance, a spring clamp might be used instead of the pin 17, and a spiral spring provided with a hook might be used instead of the clasp 20.

I claim:

1. In a net cage, wherein a net is tautly stretched over a hollow springy support having a top rim and a bottom rim and wherein the net forms inwardly tapering funnel shaped inlet portions depending from said top and bottom rims respectively, said inlet portions being urged towards each other by tie means against the spring action of the support, the improvement which comprises a hatch formed by at least one of said funnel-shaped inlet portions, said hatch comprising an edge-forming member extending substantially concentrically and contiguously relative to the respective rim of the springy support, hook means for releasably securing said edge-forming member to said respective rim, hinge means attached to said respective rim for permitting turning of said edge-forming member relative to said rim about an axis dividing said rim into two parts, said net being cut in the region of said edge-forming member, the outer cut edge of the net being attached to said respective rim and the inner cut edge being attached to said edge-forming member, whereby said edge-forming member with said inner cut edge of the net attached thereto being capable of being turned outwardly only when the springy support is compressed while turning inwardly of said edge-forming member may be effected in the expanded position of the springy support.

2. A net cage for catching craw fish and the like, which comprises in combination: supporting means in the form of a compressable helical spring, said helical spring being normally in expanded condition and forming a top rim and a bottom rim opposite said top rim, a net stretched over said helical spring including said top and bottom rims, said net forming inwardly tapering, funnel-shaped inlet portions depending from said top rim and bottom rim, respectively, tie means extending through the space defined by said supporting means and said net and operatively connected to said opposite funnel-shaped inlet portions for urging the latter toward each other when the spring is in its expanded condition, at least one of said funnel-shaped net portions forming a hatch, said hatch comprising a rigid, edge-forming substantially semi-circular member extending substantially concentrically and contiguously relative to the respective rim of the helical spring, hook means for releasable securing said semi-circular edge-forming member to said respective rim, hinge means attached to said respective rim for permitting turning of said edge-forming member relative to said respective rim about an axis dividing said rim into two substantially semi-circular portions, said net being cut in the region of said edge-forming member, the outer cut edge of the net being attached to said respective rim and the inner cut edge being attached to said edge-forming member, said edge-forming member with said inner cut edge of the net attached thereto being capable of being turned outwardly only when the only helical spring is compressed while such opening is substantially prevented by said tie means when the helical spring is in its expanded condition, and said edge-forming member being capable of being turned inwardly in the expanded condition of the helical spring.

3. A cage according to claim 1 with a removable bait holder inside the cage.

4. In a net cage, wherein a net is tautly stretched over a hollow springy support having a top rim and a bottom rim and wherein the net forms inwardly tapering funnel-shaped inlet portions depending from said top and bottom rims, respectively, said inlet portions being urged towards each other by tie means against the spring action of the support, the improvement which comprises a hatch formed by at least one of said funnel-shaped inlet portions, said hatch comprising an edge-forming semi-circular member extending substantially concentrically and contiguously relative to the respective rim of the springy support, hook means for releasably securing said edge-forming member to said respective rim, hinge means attached to said respective rim for turning of said edge-forming member relative to said rim about an axis dividing the rim into two semi-circular parts, and permitting the opening of the hatch inwardly, but permitting the opening of the hatch outwardly only when the springy support is not in its expanded condition, said net being cut in the region of said edge-forming member, the outer cut edge of the net being attached to said respective rim and the inner cut edge being attached to said edge-forming member, the named tie means extending through the space defined by said supporting means and said net and operatively connected to said opposite funnel-shaped inlet portions for urging the latter toward each other and preventing thus the opening of the hatch outwardly, when the springy support is in its expanded condition.

References Cited in the file of this patent

UNITED STATES PATENTS

| | | |
|---|---|---|
| 1,445,763 | Gibbs et al. | Feb. 20, 1923 |
| 1,927,599 | Smith | Sept. 19, 1933 |

FOREIGN PATENTS

| | | |
|---|---|---|
| 114,165 | Germany | Oct. 12, 1900 |
| 459,749 | Canada | Sept. 20, 1949 |